(12) United States Patent
Najumudeen et al.

(10) Patent No.: US 12,174,867 B2
(45) Date of Patent: Dec. 24, 2024

(54) ARTIFICIAL INTELLIGENCE (AI)-BASED ENGINE FOR PROCESSING SERVICE REQUESTS

(71) Applicant: Bank of America Corporation, Charlotte, NC (US)

(72) Inventors: Syed Najumudeen, Telengana (IN); Louis Roshan Peries, Tamil Nadu (IN); Riejesh Abhirami Kumar, Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 200 days.

(21) Appl. No.: 17/667,923

(22) Filed: Feb. 9, 2022

(65) Prior Publication Data

US 2023/0252060 A1   Aug. 10, 2023

(51) Int. Cl.
| | |
|---|---|
| *G06F 16/00* | (2019.01) |
| *G06F 16/33* | (2019.01) |
| *G06F 16/332* | (2019.01) |
| *G06F 40/20* | (2020.01) |
| *G06N 3/02* | (2006.01) |

(52) U.S. Cl.
CPC ...... *G06F 16/3344* (2019.01); *G06F 16/3326* (2019.01); *G06F 40/20* (2020.01); *G06N 3/02* (2013.01)

(58) Field of Classification Search
CPC .. G06F 16/3344; G06F 16/3326; G06F 40/20; G06N 3/02
USPC ........................................................ 707/728
See application file for complete search history.

(56) References Cited

U.S. PATENT DOCUMENTS

| | | | |
|---|---|---|---|
| 10,108,965 B2 | 10/2018 | Janefalkar et al. | |
| 10,235,639 B1 | 3/2019 | Mandel et al. | |
| 11,070,454 B1* | 7/2021 | Najumudeen | ......... H04L 63/102 |
| 2020/0159778 A1 | 5/2020 | Mohanty et al. | |
| 2020/0167593 A1* | 5/2020 | Kim | ....................... G06N 20/00 |
| 2020/0401607 A1* | 12/2020 | Chan | .................... G06F 11/3442 |
| 2021/0124843 A1* | 4/2021 | Vass | ................... G06Q 30/0255 |

(Continued)

FOREIGN PATENT DOCUMENTS

| | | | | |
|---|---|---|---|---|
| CN | 110427472 A | | 11/2019 | |
| CN | 111079031 A | * | 4/2020 | ............. G06F 16/35 |

(Continued)

OTHER PUBLICATIONS

Sinjan M. Kashyap; "Rethinking Applica on Suppo Leveraging AI, data, and automation to transform the operating model"; article; https://www.Intinfotech.com/wp-content/uploads/2021/04/Rethinking-Application-Support-PoV.pdf; 12 pages; downloaded Feb. 7, 2022; A Larsen & Toubro Group Company.

*Primary Examiner* — Monica M Pyo
(74) *Attorney, Agent, or Firm* — Banner & Witcoff, Ltd.

(57) ABSTRACT

A system for processing service requests associated with an enterprise's systems and applications is described. A service request may comprise a text input from an end-user. A machine learning algorithm may be employed to determine a search string corresponding to the text input. The search string may be used to determine one or more documents, which may then be analyzed using a neural network to determine a most relevant document. A natural language processing (NLP) algorithm may then be used to process the document and provide a response to the service request.

19 Claims, 6 Drawing Sheets

(56) References Cited

U.S. PATENT DOCUMENTS

2021/0201327 A1* 7/2021 Konig ................ H04M 3/5191
2022/0066860 A1* 3/2022 Sloane ................ G06F 16/2468

FOREIGN PATENT DOCUMENTS

| CN | 110348242 B | 1/2021 |
| JP | 2020113308 A | 7/2020 |
| RU | 2753962 C2 | 8/2021 |

* cited by examiner

ARTIFICIAL INTELLIGENCE (AI)-BASED ENGINE FOR PROCESSING SERVICE REQUESTS

FIELD

Aspects described herein generally relate to the field of software and hardware maintenance, and more specifically to processing service requests associated with systems and applications in a computing network.

BACKGROUND

Production support relates to monitoring a computing environment (e.g., computing systems, applications, servers, etc.) and providing solutions resolving issues for end-users associated with the computing environment. For example, end-users may submit service requests relating to issues that they may encounter in the computing environment. These requests may be received by a production support team who may respond to the request by providing a solution. The solution may comprise performing a set of operations in the computing environment to fix an issue, or may comprise sending a message to the end-users providing instructions to resolve an issue. Production support ensures that the systems and applications run efficiently and reliably for the end-users.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure provide effective, efficient, scalable, and convenient technical solutions that address various issues associated with resolving service requests in a computing environment. One or more aspects relate to use of a neural network-based algorithm for determine relevant documentation associated with a submitted service request. Additional aspects relate to applying natural language processing (NLP) to the documentation to provide solutions for the service request.

In accordance with one or more arrangements, a computing platform may comprise at least one processor; and memory storing computer-readable instructions that, when executed by the at least one processor, cause the computing platform to perform one or more operations. The computing platform may receive a service request, wherein the service request may comprise a text input at a user computing device. The computing platform may determine, using a machine learning algorithm, a search string corresponding to the text input. Following this, the computing platform may scan, using the search string, a database (e.g., a knowledge base, an e-mail database) to determine raw data associated with the search string. The raw data may comprise, for example, a plurality of documents that comprise the search string. The computing platform may process, using a neural network, the raw data to generate an output data set. In an example arrangement, the output data set may comprise a most relevant document, among the plurality of documents, comprising the search string. Based on natural language processing (NLP) of the output data set, the computing platform may perform one or more actions for responding to the service request.

In some arrangements, the performing the one or more actions for responding to the service request may comprise, to the user computing device, one or more electronic messages generated based on one or more selected portions of the output data set. The one or more messages may comprise the one or more selected portions of the output data set.

In some arrangements, the performing the one or more actions for responding to the service request may comprise performing one or more actions as indicated in one or more selected portions of the output data set. For example, the computing platform may, based on NLP of the output data set, generate an executable code which, when executed, may cause performance the one or more actions.

In some arrangements, the service request may correspond to an issue associated with an online service. The one or more actions may comprise an ordered sequence of steps for restarting the online service.

In some arrangements, the computing platform may receive a second service request, wherein the second service request may comprise a text input at the user computing device. The computing platform may determine, using the machine learning algorithm, a second search string corresponding to the text input. Then, the computing platform may scan, using the second search string, the database to determine second raw data associated with the second search string. The second raw data may comprise a second plurality of documents that comprise the second search string. The computing platform may process, using the neural network, the second raw data to generate a second output data set. The second output data set may comprise a most relevant document, among the second plurality of documents, comprising the second search string. Based on NLP of the second output data set, the computing platform may determine that a relevant match for the second service request is not found within the second output data set. Based on determining that a relevant match for the second service request is not found within the second output data set, the computing platform may send a notification to a second computing device.

In some arrangements, the computing platform may determine to perform NLP based on an applying a classification algorithm to the service request. The classification algorithm may comprise an XGBoost classifier.

In some arrangements, the plurality of documents comprises one of: support documents associated with an application for which the service request was received; electronic mail data; historical service requests and information associated with their resolution; and combinations thereof.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
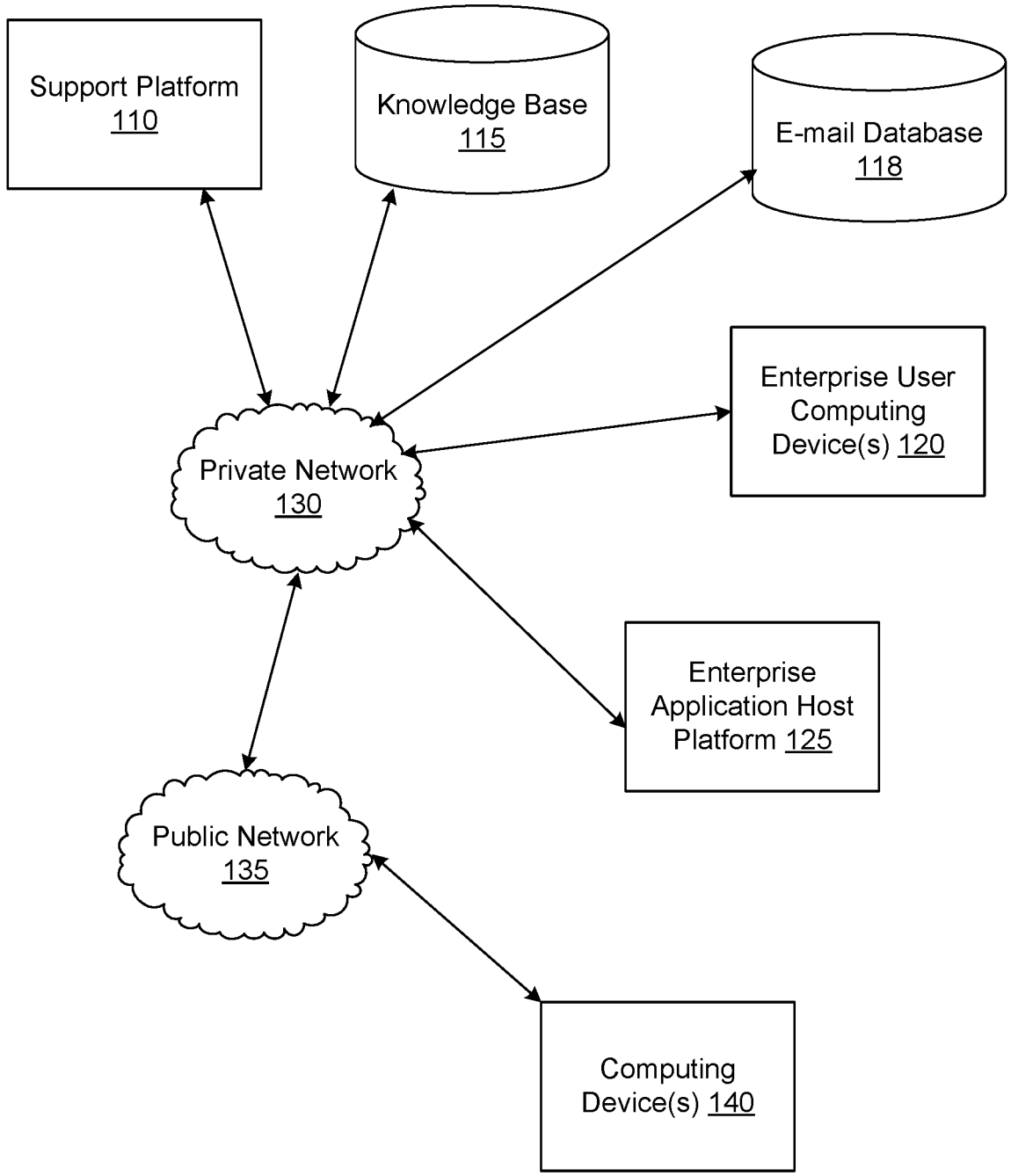
FIG. 1A shows an illustrative computing environment for providing services, applications, and/or systems to end-users, and/or processing service requests from end-users, in accordance with one or more example arrangements.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

A typical lifecycle for an application comprises development, testing, and production phases. Support teams for the application typically work during the testing and production phases, and are involved with resolving any issues that may arise. The support teams often work with development teams for issue resolution and providing improvements for the application. The application may run on end-user computing devices, may communicate with one or more servers to provide services for the end-user, and/or may be accessible via the Internet. End-users for the application may be other enterprise organizations, organizations and/or individual users.

End-users for the application may submit service requests and/or incident reports associated with the application. Providing real-time support to respond to the service requests/incident reports may require multiple teams (e.g., working in different shifts). Individuals within the support teams may have differing expertise levels. Experts within the teams (e.g., subject matter experts (SMEs)) may be able to provide quick resolution to any issues, while newer employees may have to refer to support documentation for the application and may need a longer time period to analyze an issue prior to providing the solution. Some issues may only be handled by SMEs, who may not always be on call for providing a resolution (which may, in turn, negatively impact critical applications that may need immediate resolution). As such, there is an increased dependency on SMEs to provide efficient and effective support.

Various examples herein describe methods, systems, and devices for providing effective support for service requests provided by end-users. The example methods, systems, and devices may use machine learning based algorithms that may be applied on a database comprising support documentation for handling service requests. An input service request may be used to filter the database to generate a filtered data set. Following this, a natural language processing (NLP) algorithm may process the filtered data set to determine machine-readable instructions that may be executed to provide a resolution to the service request. For example, the machine-readable instructions, when executed, may result in the steps outlined in the support documentation, as relating to the service request, to be applied. As another example, the machine-readable instructions, when executed, may result in a message (e.g., an e-mail) being sent to the end-user providing an ordered sequence of steps to be implemented by the end-user to resolve the issue. IN this manner, manual review of the service request by the production team may be minimized.

Additional examples herein describe techniques for determining when to use the above machine learning and NLP based approach for processing a service request. For example, a computing platform may implement a clustering algorithm to categorize incoming service requests into two groups. Service requests falling within a first group may be processed using the above machine learning and NLP-based approach. Service requests falling in a second group may be processed based on review by the support team.

FIG. 1A shows an illustrative computing environment 100 for providing services, applications, and/or systems to end-users, and/or processing service requests from end-users, in accordance with one or more arrangements. The computing environment 100 may comprise one or more devices (e.g., computer systems, communication devices, and the like). The one or more devices may be connected via one or more networks (e.g., a private network 130 and/or a public network 135). For example, the private network 130 may be associated with an enterprise organization which may develop and support service, applications, and/or systems for its end-users. The computing environment 100 may comprise, for example, a support platform 110, a knowledge base 115, an e-mail database 118, one or more enterprise user computing device(s) 120, and/or an enterprise application host platform 125 connected via the private network 130. Additionally, the computing environment 100 may comprise one or more computing device(s) 140 connected, via the public network 135, to the private network 130. Devices in the private network 130 and/or the public network 135 may access services, applications, and/or systems provided by the enterprise application host platform 125 and supported/serviced/maintained by the support platform 110.

The devices in the computing environment 100 may transmit/exchange/share information via hardware and/or software interfaces using one or more communication protocols over the network 135. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), and the like).

The support platform 110 may comprise one or more computing devices and/or other computer components (e.g., processors, memories, communication interfaces) configured to perform one or more functions as described herein. Further details associated with the architecture of the support platform 110 are described with reference to FIG. 1B.

The knowledge base 115 may comprise support/troubleshooting documentation associated with the various services/applications supported by the enterprise organization for its end-users. For example, the documentation may provide an ordered sequence of steps to be performed for troubleshooting any issues that may arise during operations of the services/applications. The knowledge base 115 may be populated by prior solutions provided by a support team, associated with maintenance and/or development of the services/applications, for resolution of prior issues that may been flagged by end-users. For example, an application running on computing devices associated with the support team, may capture prior solutions (e.g., as provided by the support team) and send the solutions to the knowledge base 115 for future reference/use.

The e-mail database 118 may comprise archived e-mail data/documents associated with resolution of any previous issues corresponding to the services/applications. For example, the e-mail database may comprise any e-mails/messages, exchanged between members of a support team associated with maintenance and/or development of the services/applications, for resolution of prior issues that may been flagged by end-users.

The enterprise application host platform 125 may comprise one or more computing devices and/or other computer components (e.g., processors, memories, communication interfaces). In addition, the enterprise application host platform 125 may be configured to host, execute, and/or otherwise provide one or more services/applications for the end-users. For example, if the computing environment 100 is associated with a financial institution, the enterprise application host platform 125 may be configured to host, execute, and/or otherwise provide one or more transaction processing programs (e.g., online banking application, fund transfer applications, electronic trading applications), applications for generation of regulatory reports, and/or other programs associated with the financial institution. As another example, if the computing environment 100 is associated with an online streaming service, the enterprise application host platform 125 may be configured to host, execute, and/or otherwise provide one or more programs for storing and providing streaming content to end-user devices. The above are merely exemplary use-cases for the computing environment 100, and one of skill in the art may easily envision other scenarios where the computing environment 100 may be utilized to provide and support end-user applications.

The enterprise user computing device(s) 120 may be personal computing devices (e.g., desktop computers, laptop computers) or mobile computing devices (e.g., smartphones, tablets). In addition, the enterprise user computing device(s) 120 may be linked to and/or operated by specific enterprise users (who may, for example, be employees or other affiliates of the enterprise organization). An authorized user (e.g., an SME, or any user associated with a development/support team) may use an enterprise user computing device 120 to develop and/or support services/applications provided by the enterprise organization. An authorized user (e.g., an end-user) may use an enterprise user computing device 120 to access services/applications provided by the enterprise organization, or to submit service requests and/or incident reports associated with any of the services/applications.

The computing device(s) 140 may be personal computing devices (e.g., desktop computers, laptop computers) or mobile computing devices (e.g., smartphones, tablets). An authorized user (e.g., an end-user) may use a computing device 140 to access services/applications provided by the enterprise organization, or to submit service requests and/or incident reports associated with any of the services/applications.

In one or more arrangements, the support platform 110, the knowledge base 115, the e-mail database 118, the enterprise user computing device(s) 120, the enterprise application host platform 125, the computing device(s) 140, and/or the other devices/systems in the computing environment 100 may be any type of computing device capable of receiving input via a user interface, and communicating the received input to one or more other computing devices in the computing environment 100. For example, the support platform 110, the knowledge base 115, the e-mail database 118, the enterprise user computing device(s) 120, the enterprise application host platform 125, the computing device(s) 140, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the support platform 110, the knowledge base 115, the e-mail database 118, the enterprise user computing device(s) 120, the enterprise application host platform 125, the computing device(s) 140, and/or the other devices/systems in the computing environment 100 may, in some instances, be and/or comprise special-purpose computing devices configured to perform specific functions.

Figure 1B:
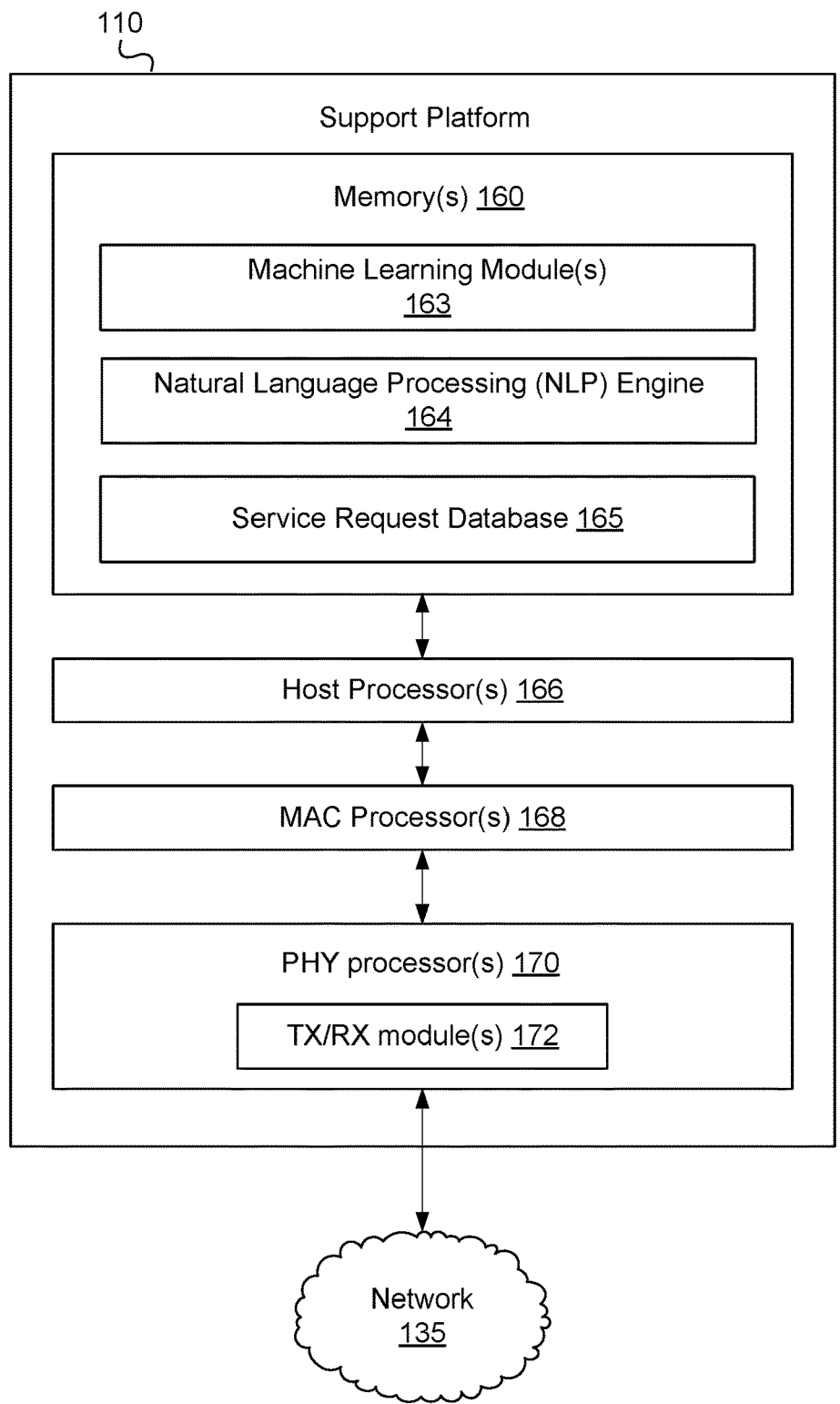
FIG. 1B shows an example support platform, in accordance with one or more example arrangements.

FIG. 1B shows an example support platform 110, in accordance with one or more examples described herein. The support platform 110 may comprise one or more of host processor(s) 166, medium access control (MAC) processor(s) 168, physical layer (PHY) processor(s) 170, transmit/receive (TX/RX) module(s) 172, memory 160, and/or the like. One or more data buses may interconnect host processor(s) 166, MAC processor(s) 168, PHY processor(s) 170, and/or Tx/Rx module(s) 172, and/or memory 160. The support platform 110 may be implemented using one or more integrated circuits (ICs), software, or a combination thereof, configured to operate as discussed below. The host processor(s) 166, the MAC processor(s) 168, and the PHY processor(s) 170 may be implemented, at least partially, on a single IC or multiple ICs. Memory 160 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 168 and/or the PHY processor(s) 170 of the support platform 110 may be configured to generate data units, and process received data units, that conform to any suitable wired and/or wireless communication protocol. For example, the MAC processor(s) 168 may be configured to implement MAC layer functions, and the PHY processor(s) 170 may be configured to implement PHY layer functions corresponding to the communication protocol. The MAC processor(s) 168 may, for example, generate MAC data units (e.g., MAC protocol data units (MPDUs)), and forward the MAC data units to the PHY processor(s) 170. The PHY processor(s) 170 may, for example, generate PHY data units (e.g., PHY protocol data units (PPDUs)) based on the MAC data units. The generated PHY data units may be transmitted via the TX/RX module(s) 172 over the private network 130. Similarly, the PHY processor(s) 170 may receive PHY data units from the TX/RX module(s) 172, extract MAC data units encapsulated within the PHY data units, and forward the extracted MAC data units to the MAC processor(s). The MAC processor(s) 168 may then process the MAC data units as forwarded by the PHY processor(s) 170.

One or more processors (e.g., the host processor(s) 166, the MAC processor(s) 168, the PHY processor(s) 170, and/or the like) of the support platform 110 may be configured to execute machine readable instructions stored in memory 160. The memory 160 may comprise one or more program modules/engines having instructions that when executed by the one or more processors cause the support platform 110 to perform one or more functions described herein. The one or more program modules/engines and/or databases may be stored by and/or maintained in different memory units of the support platform 110 and/or by different computing devices that may form and/or otherwise make up the support platform 110. For example, the memory 160 may have, store, and/or comprise machine learning module(s) 163, a natural language processing (NLP) engine 164, and/or a service request database 165.

The machine learning module(s) 163 may have instructions/algorithms that may cause the support platform 110 to implement machine learning processes in accordance with the examples described herein. For example, the machine learning module(s) 163 may comprise a neural network algorithm for analyzing the knowledge base 115 and the e-mail database 118 (e.g., based on a service request/incident report). Based on the analysis, the neural network algorithm may determine one or more documents/e-mails that may contain possible resolutions for the service request/incident report. Then, the NLP engine 164 may analyze the one or more documents to determine one or more actions that may be performed in response to the service request/incident report. The machine learning module(s) 163 may then determine which particular action to perform among the one or more actions (e.g., sending instructions to one or more platforms/servers in the computing environment 100, sending an alert notification to an SME, sending instructions to the end-user containing steps to be performed to resolve the issue, etc.). The machine learning module(s) 163 may additionally contain an algorithm (e.g., a classifier) to determine whether an incoming service request is to be handled by the neural network algorithm/NLP engine 164, or manually by a user associated with the development/support team. The machine learning module(s) 163 may additionally comprise a support vector machine (SVM) to gather data for manual review and service request resolution. Incoming service requests/incident reports may be queued in the service request database 165 prior to being processed by the other modules of the support platform 110. Further details associated with each of the above components are further described with respect to FIGS. 2A, 2B, 3, and 4.

The machine learning module(s) 163 may receive data and, using one or more machine learning algorithms, may generate one or more machine learning datasets (e.g., AI models) for the various functions described herein. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention.

While FIG. 1A illustrates the support platform 110, the knowledge base 115, the e-mail database 118, the enterprise user computing device(s) 120, the enterprise application host platform 125, as being separate elements connected in the network 135, in one or more other arrangements, functions of one or more of the above may be integrated in a single device/network of devices. For example, elements in the computing node 150 (e.g., host processor(s) 166, memory(s) 160, MAC processor(s) 168, PHY processor(s) 170, TX/RX module(s) 172, and/or one or more program/modules stored in memory(s) 160) may share hardware and software elements with and corresponding to, for example, the enterprise application host platform 125, the database 115, and/or the enterprise user devices 120.

Figure 2A:
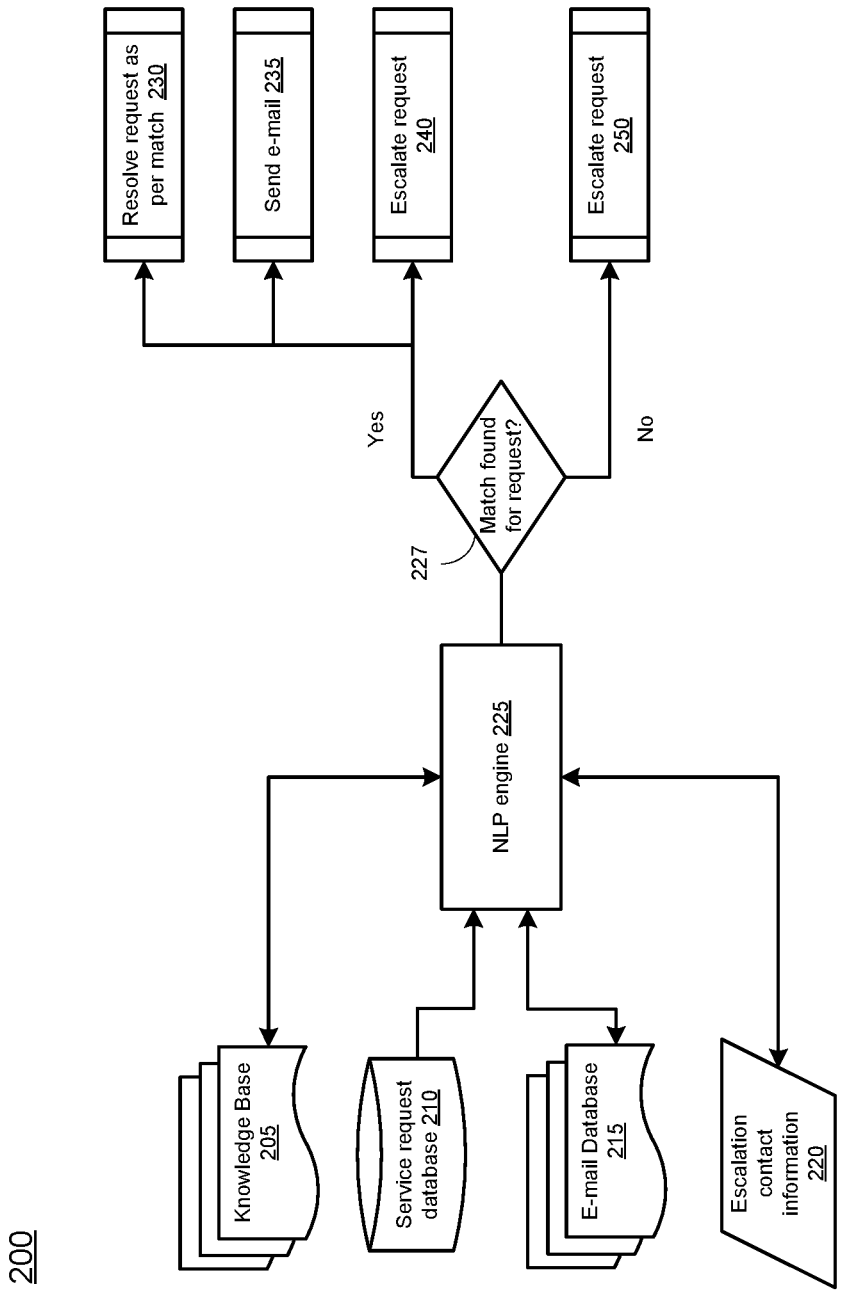
FIG. 2A shows an example method for processing incoming service requests, in accordance with one or more example arrangements.

FIG. 2A shows an example method 200 for processing incoming service requests, in accordance with one or more example arrangements. The incoming service requests may be associated with one or more applications and/or systems (hereinafter called "services") provided and/or supported by the enterprise organization. The method 200 may be performed, for example, by the support platform 110.

Incoming requests from end-users may be stored in a service request database 210 (e.g., similar to the service request database 165 of FIG. 1B) prior to being processed by the other components of the support platform 110. For example, service requests may be submitted by end-users of the service via the enterprise user computing device(s) 120 and/or the computing device(s) 140. A service request may be fetched from the service request database 210 for processing in a first-in, first-out basis. The service request may comprise text as input by an end-user, and sent via an electronic messaging system (e.g., an e-mail) or submitted using a visual interface (e.g., an interface associated with the service). The interface may, for example, comprise a textbox via which the end-user may submit the service request for processing.

A knowledge base 205 may comprise documents created by the SMEs and/or other individuals responsible for with maintenance and/or development of the services. In an arrangement, the knowledge base 205 may comprise documents that provide an ordered sequence of steps to be performed for troubleshooting/resolving service requests that may arise during accessing/operations of the services by the end-users. Additionally, the knowledge base 205 may comprise archived documents providing information relating to historical service requests/incidents and their resolutions.

An e-mail database 215 may comprise archived e-mail data/documents associated with resolution of any previous issues corresponding to the services. For example, the e-mail database may comprise any e-mails/messages, exchanged between members of a support team (e.g., SMEs and/or other individuals responsible for maintenance and/or development of the services), for resolution of prior service requests submitted by end-users.

Based on analysis of the service request, one or more documents (e.g., a data set) may be determined from the knowledge base 205 and/or the email database 215. The one or more documents may correspond to support/troubleshooting documentation for resolving the service request, archived documents providing information relating to similar historical service requests/incidents and their resolutions, and/or archived e-mails (e.g., exchanged between members of a support team responsible for maintenance of the services provided and/or supported by the enterprise organization) corresponding to the resolution of a prior, similar service request. The knowledge base 205 and the e-mail database 215 may be similar, or substantially similar to the knowledge base 115 and the e-mail database 118 as described with respect to FIG. 1A. Additional details associated with determination of the one or more documents are described with respect to FIG. 3.

The NLP engine 225 may analyze the one or more documents to determine whether a match is found for the service request. For example, the NLP engine 225 may analyze the one or more documents to determine contexts associated with the one or more documents, and further determine whether the contexts match with the service request. If a match is found for the service request, the NLP engine 225 may determine, based on the analysis of the one or more documents, a solution (e.g., an ordered sequence of steps to be performed) for resolving the service request. The solution may be to automatically perform actions, as per the ordered sequence of steps, associated with resolving the service request (step 230). For example, the NLP engine 225 may generate, based on the analysis of the one or more documents, an executable code comprising an ordered sequence of steps for resolving the service request. The support platform 110 (or the enterprise application host platform 125) may then automatically execute the code to resolve the service request. As another example, the solution may be to send a message (e.g., an e-mail, or any other electronic message) to the end-user (who submitted the service request), or a member of the support team, outlining the steps to perform for resolving the service request (step 235). For example, the NLP engine 225 may generate, based on the analysis of the one or more documents, a message indicating an ordered sequence of steps for resolving the service request. The support platform 110 may then send the message to the end-user and/or a member of the support team.

In some arrangement, the NLP engine 225 may determine more than one solution for the service request based on analysis of the one or more documents. Where more than one solution may be determined from analysis of the one or more documents for resolving the service request, a machine learning engine may be employed to determine a single solution for the service request. For example, the more than one solution may comprise (i) automatically performing actions, as per the ordered sequence of actions, associated with resolving the service request (step 230); and (ii) sending a message (e.g., an e-mail) to the end-user or a member of the support team outlining the steps to perform for resolving the service request (step 235). The machine learning algorithm may determine the single solution, among the two solutions, for the service request. The support platform 110 may automatically perform the one or more actions (step 230) or may send the message (step 235) based on the outcome of the machine learning algorithm.

The machine learning engine may use various criteria for determining the single solution among the more than one solution. The criteria may correspond to a frequency of the service request, an application/service for which the service request was submitted, whether an SME for resolving the service request is available or not, etc. For example, if the service request is a frequent service request (e.g., with a frequency above a threshold), the machine learning engine may determine to automatically perform actions, as per the ordered sequence of actions, for resolving the service request. As another example, if an SME or a member of the support team is not currently available, the machine learning engine may determine to automatically perform actions, as per the ordered sequence of actions, for resolving the service request. A list of available SMEs and members of the support team may be included in escalation contact information 220 that may be accessed by the NLP engine 225 and/or the machine learning engine. As another example, if the service request is for a specific application (e.g., a business-critical application), the machine learning engine may determine to send a message (e.g., an e-mail) to the end-user or a member of the support team outlining the steps to perform for resolving the service request (step 235). As another example, the single solution may correspond to a solution that was most frequently used for resolving similar service requests as received historically.

If the NLP engine 225 determines that a match is found for the service request, but the support platform 110 is unable to determine a solution for the service request based on the match, the support platform 110 may send a message to escalate the service request (step 240). For example, the support platform 110 may send a message (e.g., an e-mail message to an enterprise user computing device 120) indicating that no solution has been found based on the match in the knowledge base 205 or the e-mail database 215. This message may alert a member of the support team to include the solution in the knowledge base 205 for any future similar service requests. The member of the support team to which the message may be sent may be determined based on the escalation contact information 220. As another example, the support platform 110 may send a message to escalate the service request (step 240) if the service request is associated with a specific application/service.

If the NLP engine 225 determines that no match is found for the service request in the one or more documents (or if the support platform 110 is unable to determine the one or more documents in the knowledge base), the support platform 110 may send a message to escalate the service request (step 250). For example, the support platform 110 may send a message (e.g., an e-mail message to an enterprise user computing device 120) indicating that no match is found for the service request by the support platform 110. This message may alert a member of the support team to manually process the service request. The member of the support team to which the message may be sent may be determined based on the escalation contact information 220.

Figure 2B:
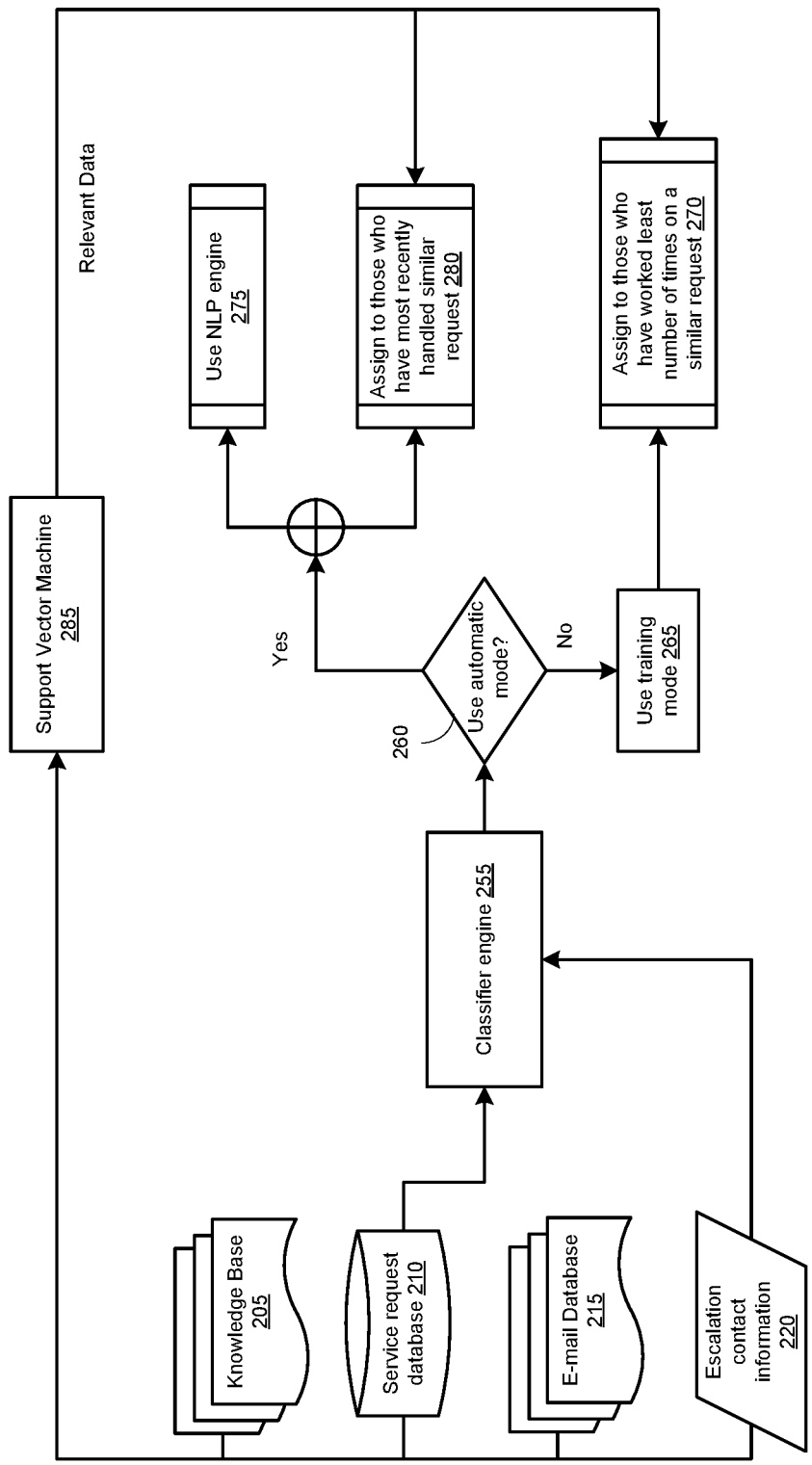
FIG. 2B shows an example method for determining a manner in which an incoming service request is to be processed, in accordance with one or more example arrangements.

FIG. 2B shows an example method 252 for determining a manner in which an incoming service request is to be processed, in accordance with one or more example arrangements. The method 252 may be used for processing a service request associated with a service (e.g., an application/system) that has been newly introduced by the enterprise organization. The method 252 may be used to determine whether the NLP engine 225 (e.g., as described with respect to FIG. 2A) is to be used for processing the service request, or if the service request is to be processed manually. In an arrangement, the service request may comprise an indicator of a service to which it corresponds. Based on the indicator, the method 252 may be applied to determine whether to use the NLP engine 225 or if the service request is to be processed manually.

A machine learning algorithm may be used to determine (step 260) whether to process the incoming service request in an automatic mode or a non-automatic mode. For example, a classifier engine 255 (e.g., an XGBoost classifier, or any other classification algorithm such as Naive Bayes, k-nearest neighbors, decision tree, etc.) may be used to make this determination. The classifier engine 255 may determine keywords associated with the service request, and based on the keywords classify the service request for processing in an automatic mode or a non-automatic mode. For example, presence of certain keywords (e.g., keywords associated with newly introduced services/applications) in the service request may trigger processing using the automatic mode, and absence of the keywords may trigger processing in a non-automatic mode.

If the classifier engine 255 determines to use an automatic mode, it may elect to use an NLP engine (e.g., step 275, NLP engine 225, as described with respect to FIG. 2A) for processing the service request, or may assign the service request to an individual associated with the support team who has most recently handled a similar service request (step 280). If the classifier elects to use the NLP engine 225, the procedure FIG. 2A may be used to process the service request.

If the classifier engine 255 determines to not use the automatic mode, it may process the service request using a training mode 265 to process the service request. In the training mode, the classifier engine 255 may assign the task to an individual who has worked the least number of times on similar service requests (step 270). This may enable members of the support team to gain expertise with respect to handling such service requests.

A support vector machine (SVM) 285 may be used to gather all relevant data, associated with the service request, from the knowledge base 205 and the e-mail database 215. For example, the SVM 285 may, based on the service request, create a cluster of data that may be relevant for processing the service request and provide them to an individual handling the service request (e.g., at steps 270 and 280).

Figure 3:
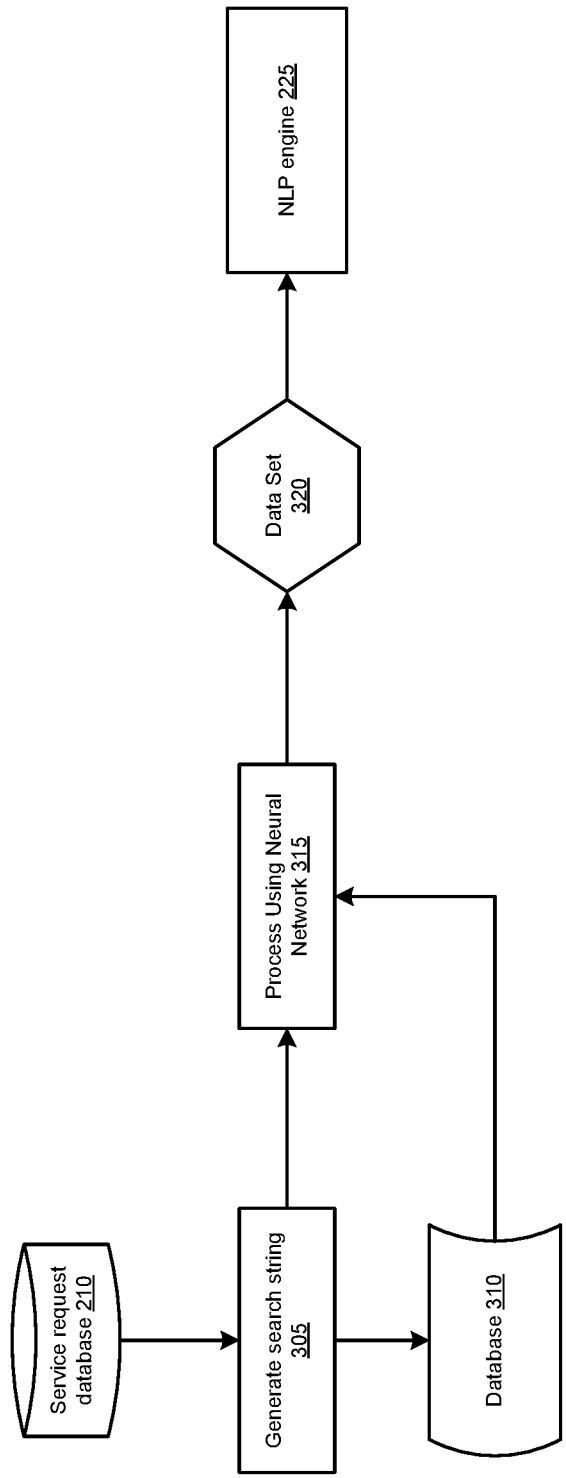
FIG. 3 shows an example method for determining a data set for resolving a service request, in accordance with one or more example arrangements.

FIG. 3 shows an example method 300 for determining a data set for resolving a service request, in accordance with one or more example arrangements. The example method 300 may be performed by the support platform 110. The data set may comprise one or more documents that may be relevant for resolving the service request. As described with respect to FIG. 2A, the determined one or more documents may then be processed by the NLP engine 225 for determining a solution for the service request.

At step 305, the support platform 110 may determine a search string corresponding to the service request as stored in the service request database 210. For example, a machine learning algorithm may be used to identify keywords within a submitted service request and determine the search string based on the identified keywords. As another example, the support platform 110 may comprise a database of phrases/words. The support platform may determine, based on the service request, the search string as comprising phrases/words as may be present in the service request. For example, a service request may comprise the statement: "Unable to access ABC service. Service may need to be restarted/reset." Based on the statement included in the service request, the machine learning algorithm may determine the search string as "ABC service restart."

The support platform 110 may use the search string to scan the database 310. The database may correspond to the knowledge base 205 and/or the e-mail database 215 as described with respect to FIGS. 2A and 2B. The database may comprise to support/troubleshooting documentation for resolving various service requests, archived documents/reports providing information relating to historical service requests/incidents and their resolutions, and/or archived e-mails (e.g., exchanged between members of the support team) corresponding to the resolution of prior service requests provided and/or supported by the enterprise organization.

Based on scanning the database 310, the support platform 110 may determine "raw data" that may be associated with the search string (e.g., comprise one or more terms included in the search string). For example, the raw data may comprise a plurality of documents, e-mails, reports, etc., that may be relevant for the search string.

At step 315, the support platform 110 may process the raw data along with the search string using a neural network. The neural network may be trained to identify one or more documents, e-mail, and/or reports that may be most relevant for the search string. The one or more documents, e-mails, and/or reports may constitute a data set 320 which may then be processed by the NLP engine 225, as described with respect to FIG. 2A, to provide a solution for the service request.

Figure 4:
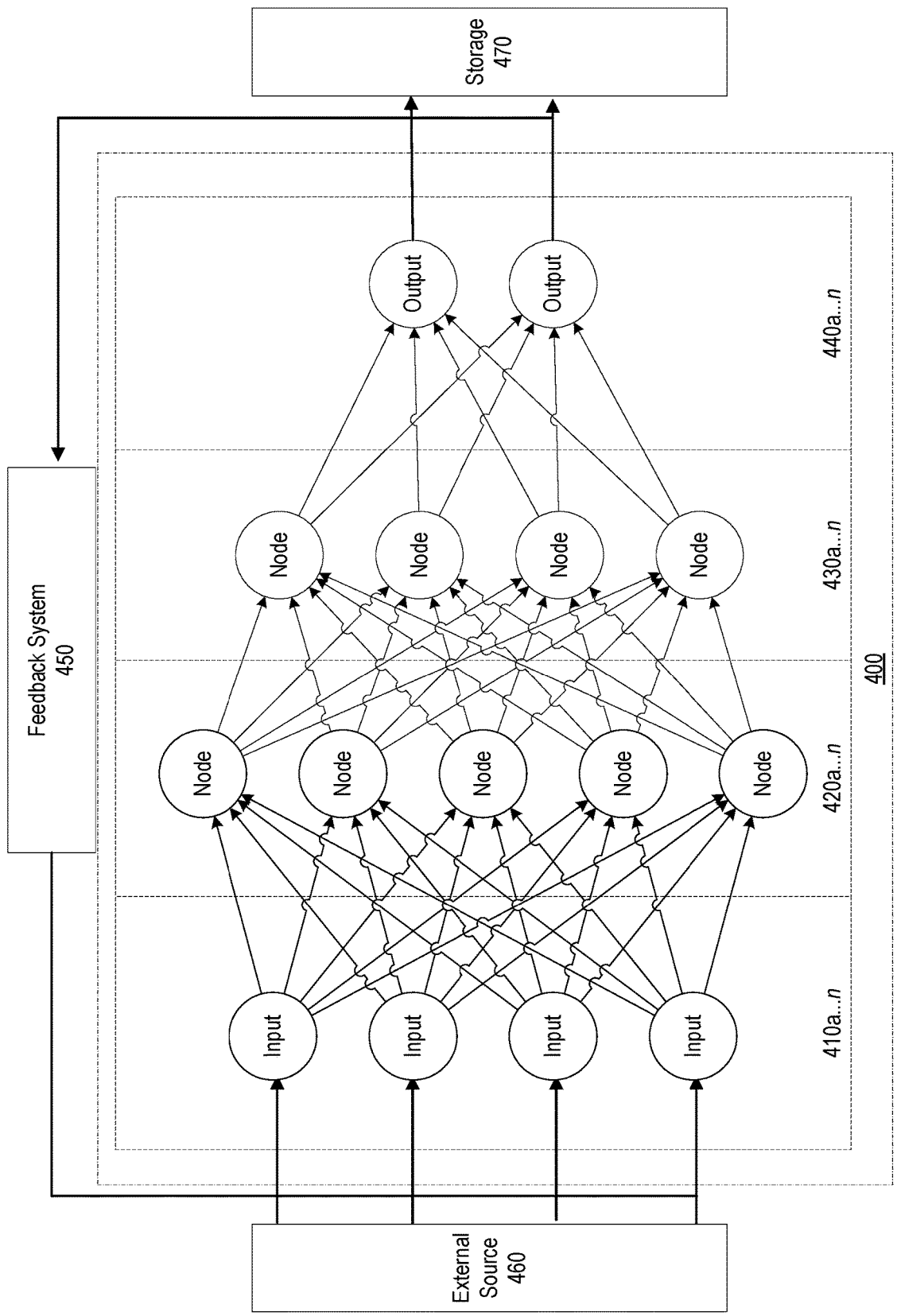
FIG. 4 shows a simplified example of an artificial neural network on which a machine learning algorithm may be executed, in accordance with one or more example arrangements.

FIG. 4 illustrates a simplified example of an artificial neural network 400 on which a machine learning algorithm may be executed, in accordance with one or more example arrangements. One or more of the aforementioned processes may use the artificial neural network 400 to implement a machine learning algorithm. For example, the artificial neural network 400 may be used at the support platform 110 for generating the data set 320 based on the raw data and the search string. As another example, the artificial neural network 400 may be used for selecting one solution among a plurality of solutions as determined by the NLP engine 225. FIG. 4 is merely an example of nonlinear processing using an artificial neural network; other forms of nonlinear processing may be used to implement a machine learning algorithm in accordance with features described herein.

In one example, a framework for a machine learning algorithm may involve a combination of one or more components, sometimes three components: (1) representation, (2) evaluation, and (3) optimization components. Representation components refer to computing units that perform steps to represent knowledge in different ways, including but not limited to as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks. Such structures, while significantly more complex than conventional computer systems, are beneficial in implementing machine learning. For example, an artificial neural network may be comprised of a large set of nodes which, like neurons, may be dynamically configured to effectuate learning and decision-making.

Machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, a human administrator.

Meanwhile, in supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of 1000 photos with labeled human faces and 10,000 random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "45% correct").

One theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

In practice, machine learning systems and their underlying components are tuned by data scientists to perform numerous steps to perfect machine learning systems. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals more clear, given the nearly infinite number of variables that can possible be optimized in the machine learning system. Meanwhile, one or more of data integration, selection, cleaning, and/or pre-processing steps can sometimes be the most time consuming because the old adage, "garbage in, garbage out," also reigns true in machine learning systems.

By way of example, in FIG. 4, each of input nodes 410a-n is connected to a first set of processing nodes 420a-n. Each of the first set of processing nodes 420a-n is connected to each of a second set of processing nodes 430a-n. Each of the second set of processing nodes 430a-n is connected to each of output nodes 440a-n. Though only two sets of processing nodes are shown, any number of processing nodes may be implemented. Similarly, though only four input nodes, five processing nodes, and two output nodes per set are shown in FIG. 4, any number of nodes may be implemented per set. Data flows in FIG. 4 are depicted from left to right: data may be input into an input node, may flow through one or more processing nodes, and may be output by an output node. Input into the input nodes 410a-n may originate from an external source 460.

In one illustrative method using feedback system 450, the system may use machine learning to determine an output. The system may use one of a myriad of machine learning models including xg-boosted decision trees, auto-encoders, perceptron, decision trees, support vector machines, regression, and/or a neural network. The neural network may be any of a myriad of type of neural networks including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality. Output may be sent to a feedback system 450 and/or to storage 470.

In an arrangement where the neural network 400 is used for determining the data set 320, the input from the input nodes may be raw data and the search string, and the output may be an indication of one or more documents (e.g., in the raw data) that comprise the data set 320. In an arrangement where the neural network 400 is used for determining a solution among a plurality of solutions determined by the NLP engine 225, the input from the input nodes may be the plurality of solutions, and the output may be an indication of a single solution to be implemented by the support platform 110.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tanh function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting—regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially.

In one example, FIG. 4 depicts nodes that may perform various types of processing, such as discrete computations, computer programs, and/or mathematical functions implemented by a computing device. For example, the input nodes 410a-n may comprise logical inputs of different data sources, such as one or more data servers. The processing nodes 420*a-n* may comprise parallel processes executing on multiple servers in a data center. And, the output nodes 440*a-n* may be the logical outputs that ultimately are stored in results data stores, such as the same or different data servers as for the input nodes 410*a-n*. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 400 may learn and/or be dynamically reconfigured. Though nodes are depicted as having connections only to successive nodes in FIG. 4, connections may be formed between any nodes. For example, one processing node may be configured to send output to a previous processing node.

Input received in the input nodes 410*a-n* may be processed through processing nodes, such as the first set of processing nodes 420*a-n* and the second set of processing nodes 430*a-n*. The processing may result in output in output nodes 440*a-n*. As depicted by the connections from the first set of processing nodes 420*a-n* and the second set of processing nodes 430*a-n*, processing may comprise multiple steps or sequences. For example, the first set of processing nodes 420*a-n* may be a rough data filter, whereas the second set of processing nodes 430*a-n* may be a more detailed data filter.

The artificial neural network 400 may be configured to effectuate decision-making. As a simplified example for the purposes of explanation, the artificial neural network 400 may be configured to detect faces in photographs. The input nodes 410*a-n* may be provided with a digital copy of a photograph. The first set of processing nodes 420*a-n* may be each configured to perform specific steps to remove non-facial content, such as large contiguous sections of the color red. The second set of processing nodes 430*a-n* may be each configured to look for rough approximations of faces, such as facial shapes and skin tones. Multiple subsequent sets may further refine this processing, each looking for further more specific tasks, with each node performing some form of processing which need not necessarily operate in the furtherance of that task. The artificial neural network 400 may then predict the location on the face. The prediction may be correct or incorrect.

The feedback system 450 may be configured to determine whether or not the artificial neural network 400 made a correct decision. Feedback may comprise an indication of a correct answer and/or an indication of an incorrect answer and/or a degree of correctness (e.g., a percentage). For example, in the facial recognition example provided above, the feedback system 450 may be configured to determine if the face was correctly identified and, if so, what percentage of the face was correctly identified. The feedback system 450 may already know a correct answer, such that the feedback system may train the artificial neural network 400 by indicating whether it made a correct decision. The feedback system 450 may comprise human input, such as an administrator telling the artificial neural network 400 whether it made a correct decision. The feedback system may provide feedback (e.g., an indication of whether the previous output was correct or incorrect) to the artificial neural network 400 via input nodes 410*a-n* or may transmit such information to one or more nodes. The feedback system 450 may additionally or alternatively be coupled to the storage 470 such that output is stored. The feedback system may not have correct answers at all, but instead base feedback on further processing: for example, the feedback system may comprise a system programmed to identify faces, such that the feedback allows the artificial neural network 400 to compare its results to that of a manually programmed system.

The artificial neural network 400 may be dynamically modified to learn and provide better input. Based on, for example, previous input and output and feedback from the feedback system 450, the artificial neural network 400 may modify itself. For example, processing in nodes may change and/or connections may be weighted differently. Following on the example provided previously, the facial prediction may have been incorrect because the photos provided to the algorithm were tinted in a manner which made all faces look red. As such, the node which excluded sections of photos containing large contiguous sections of the color red could be considered unreliable, and the connections to that node may be weighted significantly less. Additionally or alternatively, the node may be reconfigured to process photos differently. The modifications may be predictions and/or guesses by the artificial neural network 400, such that the artificial neural network 400 may vary its nodes and connections to test hypotheses.

The artificial neural network 400 need not have a set number of processing nodes or number of sets of processing nodes, but may increase or decrease its complexity. For example, the artificial neural network 400 may determine that one or more processing nodes are unnecessary or should be repurposed, and either discard or reconfigure the processing nodes on that basis. As another example, the artificial neural network 400 may determine that further processing of all or part of the input is required and add additional processing nodes and/or sets of processing nodes on that basis.

The feedback provided by the feedback system 450 may be mere reinforcement (e.g., providing an indication that output is correct or incorrect, awarding the machine learning algorithm a number of points, or the like) or may be specific (e.g., providing the correct output). For example, the machine learning algorithm 400 may be asked to detect faces in photographs. Based on an output, the feedback system 450 may indicate a score (e.g., 75% accuracy, an indication that the guess was accurate, or the like) or a specific response (e.g., specifically identifying where the face was located).

The artificial neural network 400 may be supported or replaced by other forms of machine learning. For example, one or more of the nodes of artificial neural network 400 may implement a decision tree, associational rule set, logic programming, regression model, cluster analysis mechanisms, Bayesian network, propositional formulae, generative models, and/or other algorithms or forms of decision-making. The artificial neural network 400 may effectuate deep learning.

Systems, device, and methods as described herein may enable streamlined handling of service requests without over-reliance on SMEs. The machine learning mechanisms and NLP enables scanning of large data sets to prescribe solutions for submitted service requests, which may reduce outage duration. Further, the various examples herein enable streamlined updating of a knowledge base based on previously provided solutions by the SMEs.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A computing platform comprising:
a processor; and
memory storing computer-readable instructions that, when executed by the processor, cause the computing platform to:
receive a service request, wherein the service request comprises a text input at a user computing device or the service request comprises an indicator of an application associated with the service request;
determine, using a machine learning algorithm, a search string corresponding to the text input;
scan, using the search string, a database to determine raw data associated with the search string, wherein the raw data comprises a plurality of documents that comprise the search string;
process, using a neural network, the raw data and the search string to generate an output data set, wherein the output data set comprises a most relevant document, among the plurality of documents, comprising the search string; and
generate, using a natural language processing (NLP) engine and based on the output data set:
an executable code comprising an ordered sequence of actions for resolving the service request, and
a message indicating an ordered sequence of steps to be performed by a user for resolving the service request; and
based on at least one of a frequency of the service request and the application associated with the service request, perform one of:
causing execution of the code, or
sending, to the user computing device, the message indicating the ordered sequence of steps;
wherein the computer-readable instructions, when executed by the processor, cause the computing platform to, when the service request comprises the indicator of the application associated with the service request, perform, based on the indicator associated with the application, one of: causing execution of the code, or sending, to the user computing device, the message.

2. The computing platform of claim 1, wherein the message comprises one or more selected portions of the output data set.

3. The computing platform of claim 1, wherein the service request corresponds to an issue associated with an online service, and wherein the causing execution of the code comprises causing restarting the online service.

4. The computing platform of claim 1, wherein the computer-readable instructions, when executed by the processor, cause the computing platform to:
receive a second service request, wherein the second service request comprises a text input at the user computing device;
determine, using the machine learning algorithm, a second search string corresponding to the text input;
scan, using the second search string, the database to determine second raw data associated with the second search string, wherein the second raw data comprises a second plurality of documents that comprise the second search string;
process, using the neural network, the second raw data and the second search string to generate a second output data set, wherein the second output data set comprises a most relevant document, among the second plurality of documents, comprising the second search string;

based on NLP of the second output data set, determine that a relevant match for the second service request is not found within the second output data set; and based on determining that a relevant match for the second service request is not found within the second output data set, send a notification to a second computing device.

5. The computing platform of claim 1, wherein the computer-readable instructions, when executed by the processor, cause the computing platform to determine to perform NLP based on an applying a classification algorithm to the service request.

6. The computing platform of claim 5, wherein the classification algorithm comprises an XGBoost classifier.

7. The computing platform of claim 1, wherein the plurality of documents comprises one of:
support documents associated with an application for which the service request was received;
electronic mail data;
historical service requests and information associated with their resolution; and
combinations thereof.

8. The computing platform of claim 1, wherein the computer-readable instructions, when executed by the processor, cause the computing platform to:
cause execution of the code based on the frequency of the service request exceeding a threshold, or send the message indicating the ordered sequence of steps based on the application associated with the service request being a first application.

9. A method comprising:
receiving a service request, wherein the service request comprises a text input at a user computing device or the service request comprises an indicator of an application associated with the service request;
determining, using a machine learning algorithm, a search string corresponding to the text input;
scanning, using the search string, a database to determine raw data associated with the search string, wherein the raw data comprises a plurality of documents that comprise the search string;
processing, using a neural network, the raw data and the search string to generate an output data set, wherein the output data set comprises a most relevant document, among the plurality of documents, comprising the search string; and
generate, using a natural language processing (NLP) engine and based on the output data set:
an executable code comprising an ordered sequence of actions for resolving the service request, and
a message indicating an ordered sequence of steps to be performed by a user for resolving the service request; and
based on at least one of a frequency of the service request and the application associated with the service request, perform one of:
causing execution of the code, or
sending, to the user computing device, the message indicating the ordered sequence of steps;
wherein the method further comprises: when the service request comprises the indicator of the application associated with the service request, performing, based on the indicator associated with the application, one of:

causing execution of the code, or sending, to the user computing device, the message.

10. The method of claim 9, wherein the messages comprises one or more selected portions of the output data set.

11. The method of claim 9, wherein the service request corresponds to an issue associated with an online service, and wherein the execution of the code causes restarting the online service.

12. The method of claim 9, further comprising:
receiving a second service request, wherein the second service request comprises a text input at the user computing device;
determining, using the machine learning algorithm, a second search string corresponding to the text input;
scanning, using the second search string, the database to determine second raw data associated with the second search string, wherein the second raw data comprises a second plurality of documents that comprise the second search string;
processing, using the neural network, the second raw data and the second search string to generate a second output data set, wherein the second output data set comprises a most relevant document, among the second plurality of documents, comprising the second search string;
based on NLP of the second output data set, determining that a relevant match for the second service request is not found within the second output data set; and
based on determining that a relevant match for the second service request is not found within the second output data set, sending a notification to a second computing device.

13. The method of claim 9, further comprising determining to perform NLP based on an applying a classification algorithm to the service request.

14. The method of claim 13, wherein the classification algorithm comprises an XGBoost classifier.

15. The method of claim 9, wherein the plurality of documents comprises one of:
support documents associated with an application for which the service request was received;
electronic mail data;
historical service requests and information associated with their resolution; and
combinations thereof.

16. The method of claim 9, further comprising:
causing execution of the code based on the frequency of the service request exceeding a threshold, or
send the message indicating the ordered sequence of steps based on the application associated with the service request being a first application.

17. One or more non-transitory computer-readable media storing instructions that, when executed by a computing platform comprising at least one processor and memory, cause the computing platform to:
receive a service request, wherein the service request comprises a text input at a user computing device or the service request comprises an indicator of an application associated with the service request;
determine, using a machine learning algorithm, a search string corresponding to the text input;
scan, using the search string, a database to determine raw data associated with the search string, wherein the raw data comprises a plurality of documents that comprise the search string;
process, using a neural network and the search string, the raw data to generate an output data set, wherein the output data set comprises a most relevant document, among the plurality of documents, comprising the search string; and generate, using a natural language processing (NLP) engine and based on the output data set:
    an executable code comprising an ordered sequence of actions for resolving the service request, and
    a message indicating an ordered sequence of steps to be performed by a user for resolving the service request; and based on at least one of a frequency of the service request and the application associated with the service request, perform one of:
    causing execution of the code, or
    sending, to the user computing device, the message indicating the ordered sequence of steps;

wherein the instructions, when executed by the computing platform, cause the computing platform to, when the service request comprises the indicator of the application associated with the service request, performing, based on the indicator associated with the application, one of: causing execution of the code, or sending, to the user computing device, the message.

18. The one or more non-transitory computer-readable media of claim 17, wherein the messages comprises one or more selected portions of the output data set.

19. The one or more non-transitory computer-readable media of claim 17, wherein the instructions, when executed, cause the computing platform to:
    cause execution of the code based on the frequency of the service request exceeding a threshold, or
    send the message indicating the ordered sequence of steps based on the application associated with the service request being a first application.

\* \* \* \* \*